US009294970B1

United States Patent
Sitaram et al.

(10) Patent No.: US 9,294,970 B1
(45) Date of Patent: Mar. 22, 2016

(54) SELF-HEALING ALGORITHM TO OVERCOME HANDOVER FAILURE DUE TO OUT-OF-DATE NEIGHBOR LIST

(71) Applicant: SPRINT COMMUNICATIONS COMPANY, L.P., Overland Park, KS (US)

(72) Inventors: Krishna Sitaram, Chantilly, VA (US); Daniel Alberto Vivanco, Sterling, VA (US); Chunmei Lu, Great Falls, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 181 days.

(21) Appl. No.: 14/152,543

(22) Filed: Jan. 10, 2014

(51) Int. Cl.
*H04W 36/00* (2009.01)

(52) U.S. Cl.
CPC ...... *H04W 36/0061* (2013.01); *H04W 36/0083* (2013.01); *H04W 36/0088* (2013.01)

(58) Field of Classification Search
CPC .............. H04W 36/0061; H04W 36/0083; H04W 36/0088
USPC ........................................................ 455/436
See application file for complete search history.

(56) References Cited

U.S. PATENT DOCUMENTS

| 8,588,089 | B2 | 11/2013 | Dottling |
| 8,861,494 | B2 | 10/2014 | Mukhopadhyay |
| 2005/0130655 | A1 | 6/2005 | Lundh et al. |
| 2008/0227455 | A1 | 9/2008 | Kim |
| 2011/0143743 | A1* | 6/2011 | Pollakowski ......... H04L 41/082 455/422.1 |
| 2011/0268044 | A1 | 11/2011 | Yun et al. |
| 2012/0026918 | A1* | 2/2012 | Won ................... H04W 36/0061 370/255 |
| 2012/0099442 | A1 | 4/2012 | Bakker et al. |
| 2012/0275315 | A1 | 11/2012 | Schlangen et al. |
| 2014/0073304 | A1* | 3/2014 | Brisebois ............... H04W 24/02 455/418 |
| 2015/0043386 | A1 | 2/2015 | Récz et al. |

OTHER PUBLICATIONS

First Action Interview Preinterview Communication dated Jun. 30, 2015 in U.S. Appl. No. 14/152,504, 5 pages.
First Action Interview Preinterview Communication dated Oct. 7, 2015 in U.S. Appl. No. 14/152,533, 5 pages.
Notice of Allowance dated Nov. 19, 2015 in U.S. Appl. No. 14/152,533, 11 pages.
Notice of Allowance dated Dec. 21, 2015 in U.S. Appl. No. 14/152,504, 17 pages.

* cited by examiner

*Primary Examiner* — Barry Taylor

(57) ABSTRACT

A base station's neighbor list may become outdated as nearer base stations are deployed. Because mobile devices report non-unique identifiers of surrounding base stations, a serving base station may confuse a newer neighboring base station with an out-of-date neighboring base station having the same non-unique identifier. The base station may attempt to hand over the mobile device to the wrong base station based on its outdated neighbor list. A determination may be made that first and second base stations share an identical non-unique identifier. A determination may be made that the first and second base stations' neighbor lists include an identical unique identifier associated with a third base station. The earlier of the two base stations is determined, and the neighbor relationship between the earlier base station and the third base station is removed from their associated neighbor lists.

20 Claims, 7 Drawing Sheets

SELF-HEALING ALGORITHM TO OVERCOME HANDOVER FAILURE DUE TO OUT-OF-DATE NEIGHBOR LIST

CROSS-REFERENCE TO RELATED APPLICATIONS

This application is related by subject matter to the following concurrently filed U.S. Patent Applications: U.S. application Ser. No. 14/152,504, entitled "Updating an Out-Of-Date Source Neighbor List," and U.S. application Ser. No. 14/152,533, entitled "Overcoming Handover Failure Due to Out-Of-Date Neighbor List," both of which are incorporated by reference herein.

SUMMARY

A high-level overview of various aspects of the invention are provided here for that reason, to provide an overview of the disclosure and to introduce a selection of concepts that are further described below in the detailed description section. This summary is not intended to identify key features or essential features of the claimed subject matter, nor is it intended to be used as an aid in isolation to determine the scope of the claimed subject matter. In brief and at a high level, a base station maintains a neighbor list of base stations that is utilized during handover of a device, such as a mobile device. During initial deployment of base stations in a market, a base station's neighbor list may become outdated as additional, nearer base stations are deployed. Because a mobile device reports the identities of surrounding base stations based on non-unique identifiers associated with the base stations, a base station may confuse a newly deployed neighboring base station with an out-of-date neighboring base having the same non-unique identifier as the newly deployed base station. In that event, the base station will erroneously attempt to hand over the mobile device to the wrong base station because the base station's neighbor list is out of date. A network element may maintain a master neighbor list that is an aggregate of the neighbor lists from a plurality base stations within the network or within a given market. The network element may include one or more network elements, and may reside in the core network. The network element may periodically pull, from the base stations, information that includes the non-unique identifier and a unique identifier for each base station. The information may be maintained in a table that includes an entry for each base station. Updates to the table may be monitored, and if a new entry is detected with the same non-unique identifier as an existing base station in the table, then the neighbor lists may be pulled for each base station having the same non-unique identifier. If the neighbor lists share one or more identical unique identifiers, then one or more of the neighbor lists is out of date.

BRIEF DESCRIPTION OF THE SEVERAL VIEWS OF THE DRAWINGS

Illustrative embodiments of the present invention are described in detail below with reference to the attached drawing figures, and wherein.

DETAILED DESCRIPTION

Figure 1:
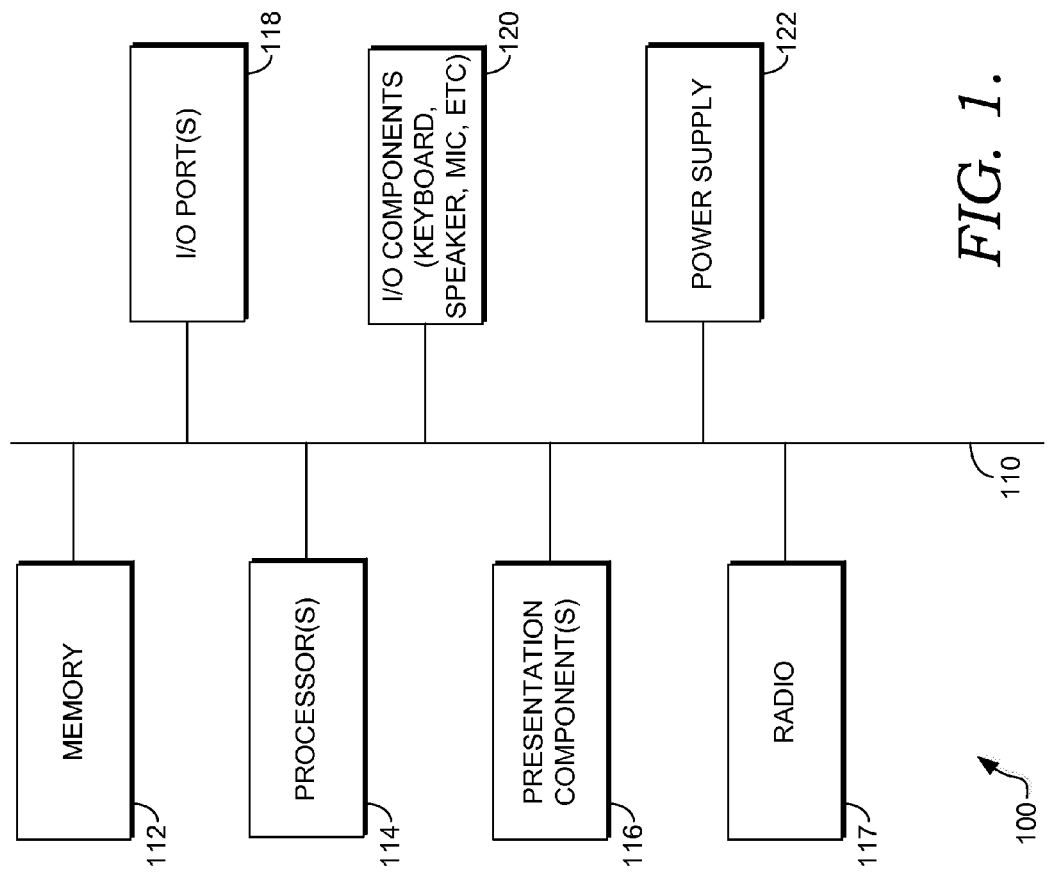
FIG. 1 depicts a block diagram of a mobile computing device ("mobile device") suitable for use in accordance with an embodiment of the present invention.

The subject matter of select embodiments of the present invention is described with specificity herein to meet statutory requirements. But the description itself is not intended to define what we regard as our invention, which is what the claims do. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:

ANR Automatic Neighbor Relations
CDMA Code Division Multiple Access
DNS Domain Name Server
ECGI E-UTRAN Cell Global Identifier
ECI E-UTRAN Cell Identifier
eNB Enhanced Node B
eNode B Enhanced Node B
E-UTRAN Evolved UMTS Terrestrial Radio Access Network
GIS Geographic Information System
GPRS General Packet Radio Service
GSM Global System for Mobile Communications
LTE Long Term Evolution
MCC Mobile Country Code
MME Mobility Management Entity
MNC Mobile Network Code
PCI Physical Cell Identifier
PLMN Public Land Mobile Network
RACH Random Access Channel
RRC Radio Resource Control
TDMA Time Division Multiple Access
UMTS Universal Mobile Telecommunications System
X2AP X2 Application Protocol Some embodiments of the present invention may be embodied as, among other things: a method, system, or set of instructions embodied on one or more computer-readable media. Computer-readable media include both volatile and nonvolatile media, removable and nonremovable media, and contemplate media readable by a database, a switch, and various other network devices. By way of example, and not limitation, computer-readable media include media implemented in any method or technology for storing information readable by a computing device. Examples of stored information include program modules including instructions, data structures, other data representations, and the like. Media examples include, but are not limited to information-delivery media, devices such as RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Some embodiments of the present invention are described herein in terms of an LTE network. However, embodiments are not limited to an LTE network, but rather may include any type of network that provides similar functionality to LTE. A handover of a mobile terminal requires a serving cell to know about the existence of neighboring cells. This information may be stored as a neighbor list, or neighbor relation table. The management of neighbor cell relations can be a time consuming task both for new technology deployments such as LTE, and for provisioning of 2G and 3G cells. Automatic Neighbor Relations (ANR), which is a part of the Long Term Evolution (LTE) standard, is intended to reduce the amount of intervention necessary by a service provider within its network during the process of managing neighbor cell relations.

An exemplary network includes base stations that communicate with user devices such as mobile phones, laptop computers, tablet devices, and so forth. In the case of LTE, a base station is referred to as an enhanced Node B, often abbreviated as eNode B or eNB. An eNB is associated with a plurality of identifiers. A Physical Cell Identifier (PCI) identifies the cell that is served by the eNB. There are currently a total of 504 PCIs defined for use within LTE networks. That limited number can result in PCI reuse within a market, such as when an LTE network is rolled out in a dense metropolitan area. Thus, the PCI is a non-unique identifier, because it may be reused within a market and does not uniquely identify an eNB.

An eNB is also associated with an E-UTRAN cell identifier (ECI) that unambiguously identifies a cell within a public land mobile network (PLMN). The PLMN is identified by a mobile country code (MCC) and mobile network code (MNC). The PLMN identifier and ECI together form the E-UTRAN cell global identifier (ECGI), which is a system-level parameter that is unique. Thus, each eNB possesses both a non-unique identifier and a unique identifier.

An eNB maintains its neighbor list that is utilized during handover of an LTE terminal, such as a mobile device. The neighbor list includes neighboring base stations to which an LTE terminal may be handed over. Traditionally, a base station's neighbor list was created manually as a network was deployed. However, using ANR, the neighbor list is learned by the eNB on the fly. In general terms, a serving eNB, utilizing the Radio Resource Control (RRC) protocol, sends RRC Measurement Control messages to instruct LTE terminals with which it is communicating to take quality measurements of neighboring cells on a periodic basis. In response, each LTE terminal returns an RRC Measurement Report that identifies the PCIs of other eNBs the LTE terminal is receiving and respective signal strengths associated with the eNBs. When an LTE terminal reports a PCI that is not listed in the serving eNB's neighbor list, the serving eNB instructs the terminal to report the ECGI of the eNB identified by the PCI. Once the ECGI is received, the serving eNB updates its neighbor list to include the PCI and ECGI for the newly discovered eNB.

In the initial stage of deploying a network in a given market, base stations are few, and are deployed in a "popcorn" fashion, i.e., one here, one there, in a widely spread, scattered fashion. This stage of network deployment is referred to herein as the popcorn stage. During the popcorn stage, an eNB may populate its neighbor list with base stations that are relatively far away, in comparison to the proximity of neighbors in a fully-deployed network. As more base stations are gradually deployed, it is likely that the eNB's neighbor list will grow to include base stations that are nearer than those initially discovered.

When a base station is deployed near the eNB, and happens to share the same PCI as a more distant base station in the eNB's neighbor list, a situation referred to herein as "PCI confusion" may occur. An LTE terminal may report the PCI of the nearby base station to the eNB, and the eNB may determine to hand over the LTE terminal to that base station, based on the measurement report, but the eNB's neighbor list is outdated, because it includes the PCI and ECGI of the base station that is farther away. Thus, the eNB will attempt to hand over the LTE terminal to the base station in the neighbor list, rather than the nearby base station that has the same PCI as the more distant base station. The result is that the handover will fail.

In a first aspect, computer-readable media are provided for facilitating a method for updating a neighbor list. A determination is made that a first base station and a second base station share an identical non-unique base station identifier. A determination is made that a first neighbor list and a second neighbor list that are respectively associated with the first base station and the second base station each include an identical unique identifier associated with a third base station. A determination is made as to which of the first base station and the second base station was the earlier base station added to the market. The earlier base station is instructed to remove the third base station from the earlier base station's respective neighbor list, and the third base station is instructed to remove the earlier base station from the third base station's neighbor list.

In a second aspect, computer-readable media are provided for facilitating a method for updating a neighbor list. A list is generated that includes a respective entry for each of a plurality of base stations in a market. For each base station, the respective entry includes a non-unique identifier and a unique identifier that are associated with the base station. A determination is made that a first entry and a second entry in the list share an identical non-unique identifier, where the first entry and the second entry correspond respectively to a first base station and a second base station. A determination is made that the first base station and the second base station each has a neighbor associated with an identical unique identifier. A third base station is identified that is associated with the identical unique identifier. A determination is made that the second entry was updated to the list more recently than the first entry. Based on the determination that the second entry was updated to the list more recently than the first entry, the first base station associated with the first entry is instructed to remove the third base station from the first base station's neighbor list, and the third base station is instructed to remove the first base station from the third base station's neighbor list.

In a third aspect, a system is provided for updating a neighbor list. The system includes a plurality of base stations. Each base station is configured to A) maintain a neighbor list associated with the base station, where the neighbor list includes entries for neighboring base stations, and each entry includes a non-unique identifier and a unique identifier that are associated with a neighboring base station, and B) coordinate a handover of a mobile device from the base station to a base station in the neighbor list. The system also includes a network component. The network component configured to determine that a first base station and a second base station share an identical non-unique base station identifier, determine that a first neighbor list and a second neighbor list that are respectively associated with the first base station and the second base station each include an identical unique identifier associated with a third base station, and determine which of the first base station and the second base station was the earlier base station added to the market. The network component is also configured to instruct the earlier base station to remove the third base station from the earlier base station's neighbor list, and instruct the third base station to remove the earlier base station from the third base station's neighbor list.

Turning now to FIG. 1, a block diagram of an illustrative mobile computing device ("mobile device") is provided and referenced generally by the numeral 100. Although some components are shown in the singular, they may be plural. For example, mobile device 100 might include multiple processors or multiple radios, etc. As illustratively shown, mobile device 100 includes a bus 110 that directly or indirectly couples various components together including memory 112, a processor 114, a presentation component 116, a radio 117, input/output ports 118, input/output components 120, and a power supply 122.

Memory 112 might take the form of one or more of the aforementioned media. Thus, we will not elaborate more here, only to say that memory component 112 can include any type of medium that is capable of storing information in a manner readable by a computing device. Processor 114 might actually be multiple processors that receive instructions and process them accordingly. Presentation component 116 includes the likes of a display, a speaker, as well as other components that can present information (such as a lamp (LED), or even lighted keyboards).

Radio 117 represents a radio that facilitates communication with a wireless telecommunications network. Illustrative wireless telecommunications technologies include LTE, CDMA, GPRS, TDMA, GSM, and the like. In some embodiments, radio 117 might also facilitate other types of wireless communications including Wi-Fi communications and GIS communications.

Input/output port 118 might take on a variety of forms. Illustrative input/output ports include a USB jack, stereo jack, infrared port, proprietary communications ports, and the like. Input/output components 120 include items such as keyboards, microphones, touch screens, and any other item usable to directly or indirectly input data into mobile device 110. Power supply 122 includes items such as batteries, fuel cells, or any other component that can act as a power source to power mobile device 110.

Figure 2:
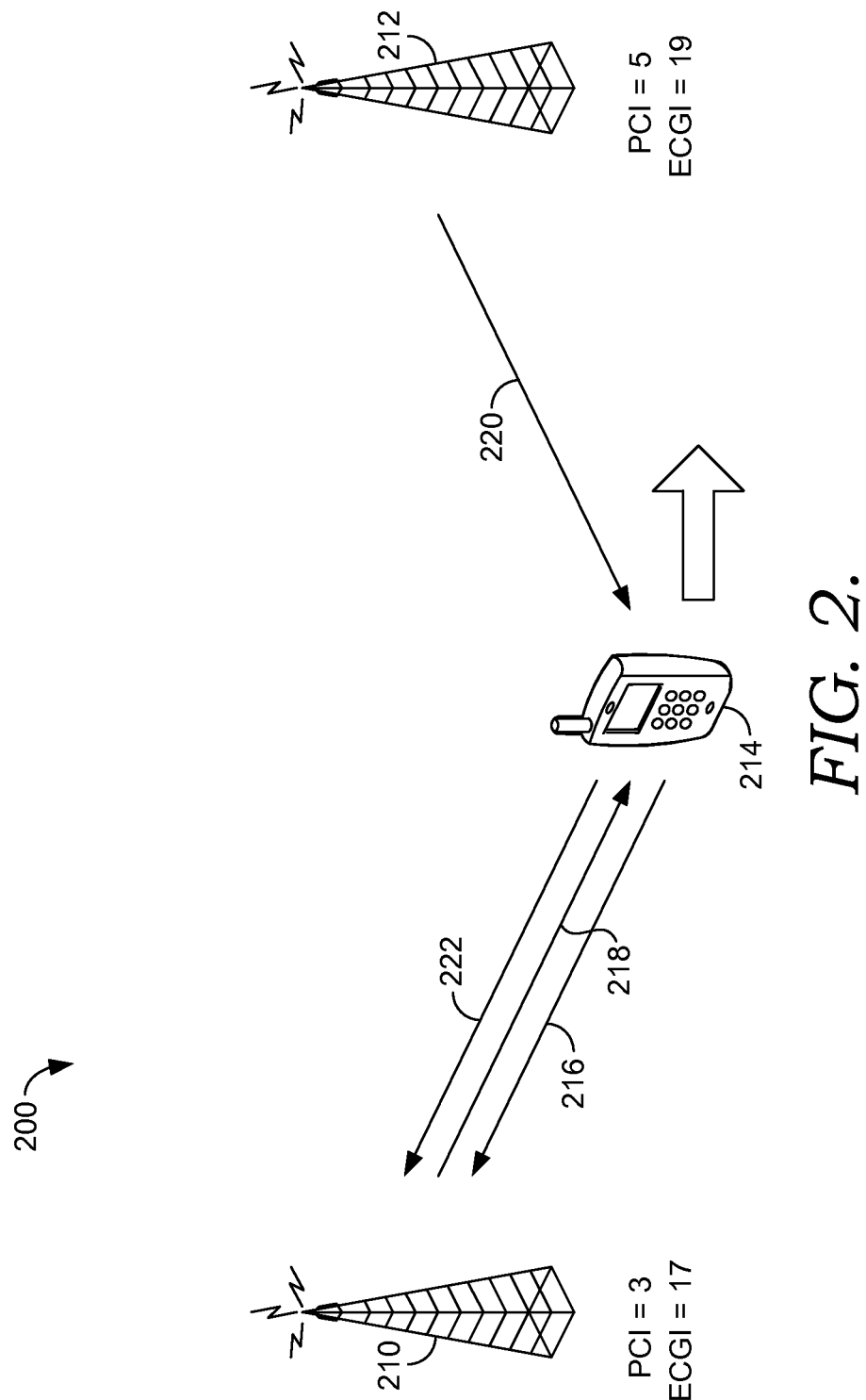
FIG. 2 depicts an operating environment suitable for use in accordance with an embodiment of the present invention.

Referring now to FIG. 2, an operating environment is depicted that is suitable for use in accordance with an embodiment of the present invention, and is generally referred to as operating environment 200. Environment 200 is utilized herein to illustrate the process of ANR. Operating environment 200 is but one example of a suitable operating environment and is not intended to suggest any limitation as to the scope of use or functionality of the invention. Neither should the operating environment 200 be interpreted as having any dependency or requirement relating to any one or combination of components illustrated.

Operating environment 200 as depicted includes a base station 210, a base station 212, and a mobile device 214. Base station 210 has a non-unique identifier equal to 3 and a unique identifier equal to 17. Base station 212 has a non-unique identifier equal to 5 and a unique identifier equal to 19. The values of 3, 5, 17, and 19 may or may not be representative of real world values for the non-unique and unique identifiers, and are intended only as illustrative examples.

In one embodiment, operating environment 200 is an LTE environment, base stations 210 and 212 are eNBs, the non-unique and unique identifiers are PCI and ECGI, respectively, and mobile device 214 is an LTE terminal. However, embodiments of the present invention are not limited to use with an LTE environment. Other types of environments having similar functionality are also suitable for use in accordance with some embodiments. Mobile device 214 may be any of a number of types of mobile devices, including mobile phones, laptop computers, tablet devices, and so forth. Mobile device 214 may include devices such as described with regard to FIG. 1.

As depicted in FIG. 2, LTE terminal 214, which is served by eNB 210, is moving from the vicinity of eNB 210 toward the vicinity of eNB 212. As described above, terminal 214 sends a measurement report 216 to eNB 210, including eNB 212's PCI=5. When eNB 210 determines that its neighbor list does not contain an entry corresponding to a PCI=5, eNB 210 sends a request 218 to terminal 214 for eNB 212's ECGI. Terminal 214 reads (item 220) eNB 212's ECGI=19 and reports it (item 222) to eNB 210. eNB 210 then updates its neighbor list to include the PCI=5 and ECGI=19 for eNB 212. Note that, when eNB 210 serves subsequent LTE terminals, eNB 210 will use the updated neighbor list. Thus, eNB 210 will not need to request the subsequent LTE terminals to read and report eNB 212's ECGI. That is a simplified description of how ANR enables a base station to update its neighbor list.

One reason the initial measurement report sent by terminal 214 reports the non-unique PCI, instead of the unique ECGI, is that the PCI is simpler for terminal 214 to decode, and thus requires less of the terminal's resources, including battery power, than if the terminal were to decode the ECGI. In a fully deployed network, when base stations' neighbor lists are up-to-date, the PCI will generally suffice to identify a neighboring base station. In the event that a serving base station does not have a neighbor-list entry for a reported PCI, then the ANR process enables the serving base station to update its neighbor list, as described above.

Figure 3:
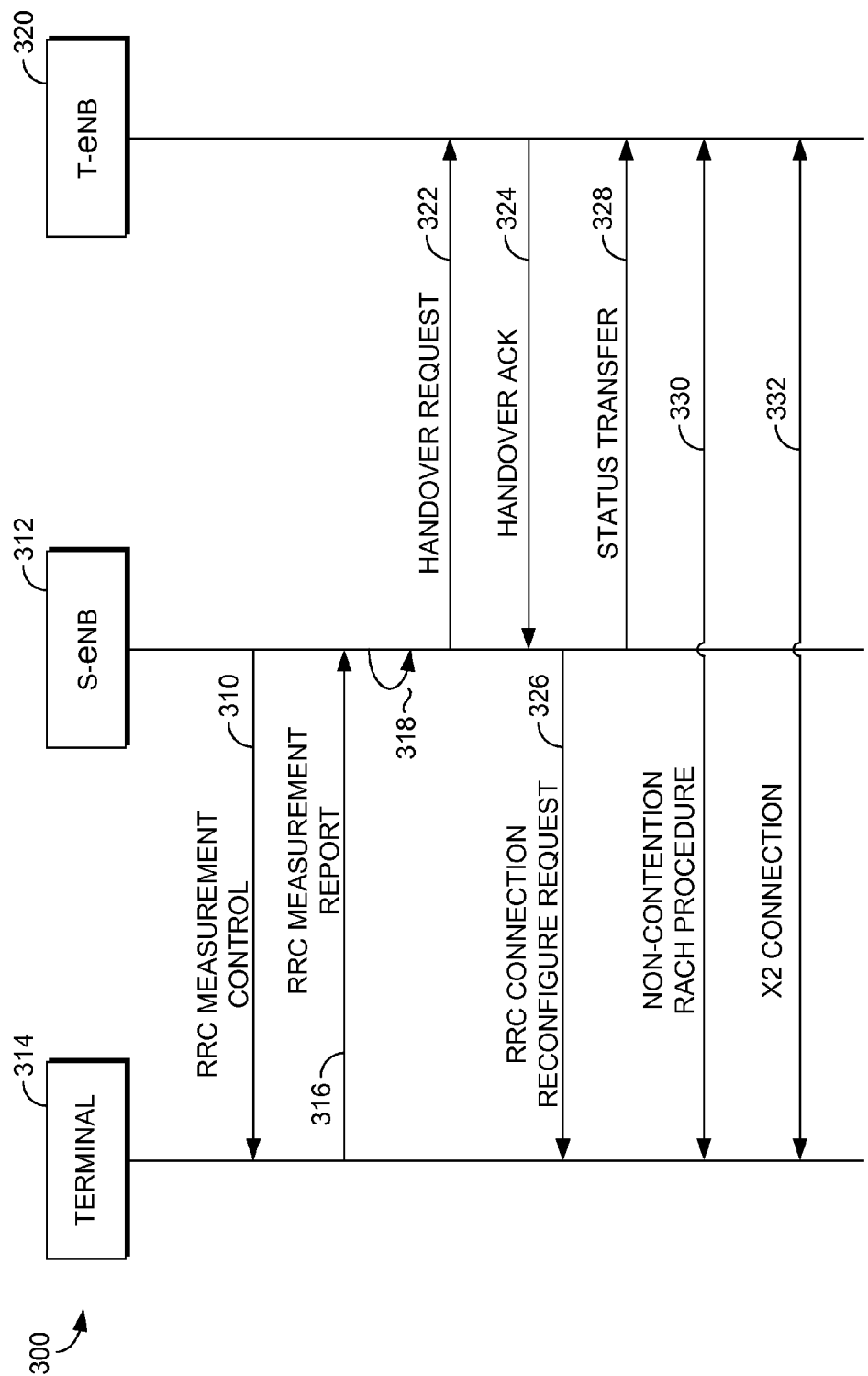
FIG. 3 depicts a diagram illustrating a simplified handover process in accordance with an embodiment of the present invention.

Referring now to FIG. 3, a diagram is depicted illustrating a simplified handover process in accordance with an embodiment of the present invention, and is generally referred to as handover process 300. Handover process 300 is but one example of a suitable handover process and is not intended to suggest any limitation as to the scope of use or functionality of the invention. Neither should handover process 300 be interpreted as having any dependency or requirement relating to any one or combination of components illustrated.

At step 310, a source base station, eNB 312, requests a measurement report from a mobile device, LTE terminal 314. At step 316, LTE terminal 314 sends the measurement report to source eNB 312. At step 318, source eNB 312 determines to hand over LTE terminal 314 to a target eNB 320, based on the received measurement report. At step 322, source eNB 312 sends a handover request to target eNB 320 and receives a handover acknowledgement at step 324. Source eNB 312 then sends a handover command to LTE terminal 314 at step 326, and sends a status transfer to target eNB 320 at step 328. At step 330, target eNB 320 initiates a non-contention Random Access Channel (RACH) procedure and an X2 connection is established between LTE terminal 314 and target eNB 320 at step 332.

As described above, a situation may arise during the popcorn stage of network deployment when a source eNB has an outdated neighbor list, and as a result, the source eNB confuses the target eNB with another eNB having the same PCI.

In that event, the RACH procedure cannot be initiated, and the LTE terminal's connection is dropped, i.e., the X2 connection is not established. When the handover fails, the LTE terminal will transmit an RRC Connection Reconfiguration Failure message. This type of situation is described with regard to FIG. 4.

Figure 4:
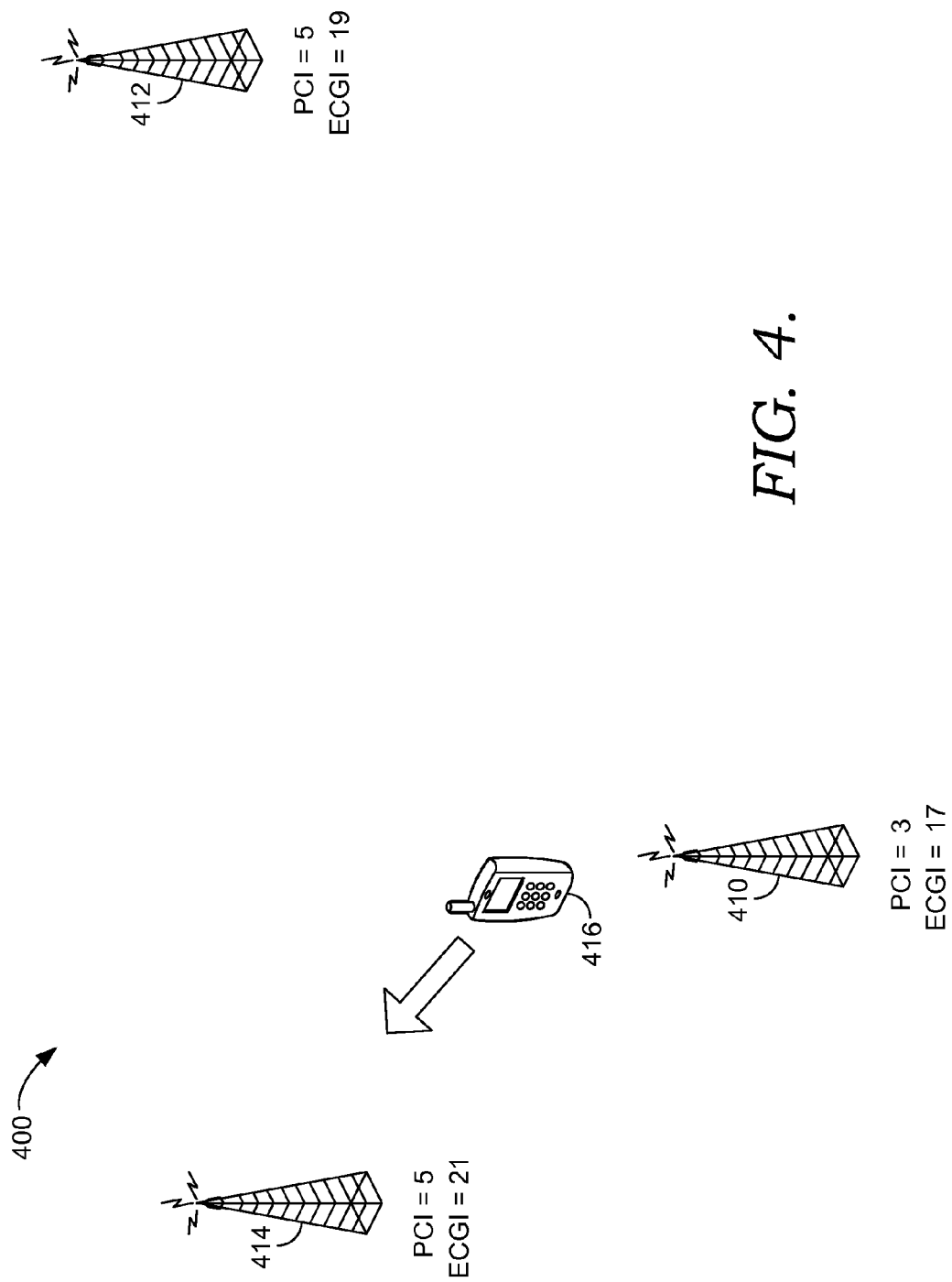
FIG. 4 depicts an operating environment suitable for use in accordance with an embodiment of the present invention.

FIG. 4 depicts an operating environment suitable for use in accordance with an embodiment of the present invention, and is generally referred to as operating environment 400. Operating environment 400 is but one example of a suitable operating environment and is not intended to suggest any limitation as to the scope of use or functionality of the invention. Neither should operating environment 400 be interpreted as having any dependency or requirement relating to any one or combination of components illustrated.

Operating environment 400 as depicted includes an eNB 410, an eNB 412, an eNB 414, and an LTE terminal 416. eNB 410 has a PCI=3 and an ECGI=17. eNB 412 has a PCI=5 and an ECGI=19. eNB 414 has a PCI=5 and an ECGI=21. As depicted, eNB 412 and eNB 414 have identical PCIs, but different ECGIs. The values of 3, 5, 17, 19, and 21 may or may not be representative of real world values for PCI and ECGI, and are intended only as illustrative examples.

Although operating environment 400 is described herein in terms of an LTE network as an example, embodiments of the present invention are not limited to use with an LTE network. Other types of networks having functionality similar to an LTE network are also suitable for use with some embodiments. Accordingly, eNBs 410, 412, and 414 may be referred to more generally as base stations 410, 412, and 414, and LTE terminal 416 may be more generally referred to as mobile device 416.

In the present example, eNB 410 is the source eNB, or serving eNB, for LTE terminal 416, which is depicted as moving from the vicinity of eNB 410 toward the vicinity of nearby eNB 414. eNB 410 and the more distant eNB 412 represent base stations that were deployed early in the popcorn stage of the network rollout, prior to the deployment of eNB 414. In the present example, prior to the deployment of eNB 414, eNB 410 determined that eNB 412 was a neighboring base station, and eNB 412 was then added to eNB 410's neighbor list. eNB 414, which is nearer to eNB 410 than is eNB 412, has not yet been discovered by eNB 410.

As depicted, eNB 414 and eNB 412 share an identical PCI=5, which can cause PCI confusion. When LTE terminal 416 sends a measurement report to eNB 410, eNB 410 determines to hand over LTE terminal 416 to the target eNB having a reported PCI=5. However, in the present example, the PCI=5 included in the measurement report corresponds to eNB 414, not the more distant eNB 412. Because eNB 410's neighbor list does not yet reflect the presence of eNB 414, eNB 410 will erroneously attempt to hand over LTE terminal 416 to eNB 412 which also has a PCI=5. The handover attempt will then fail.

Figure 5:
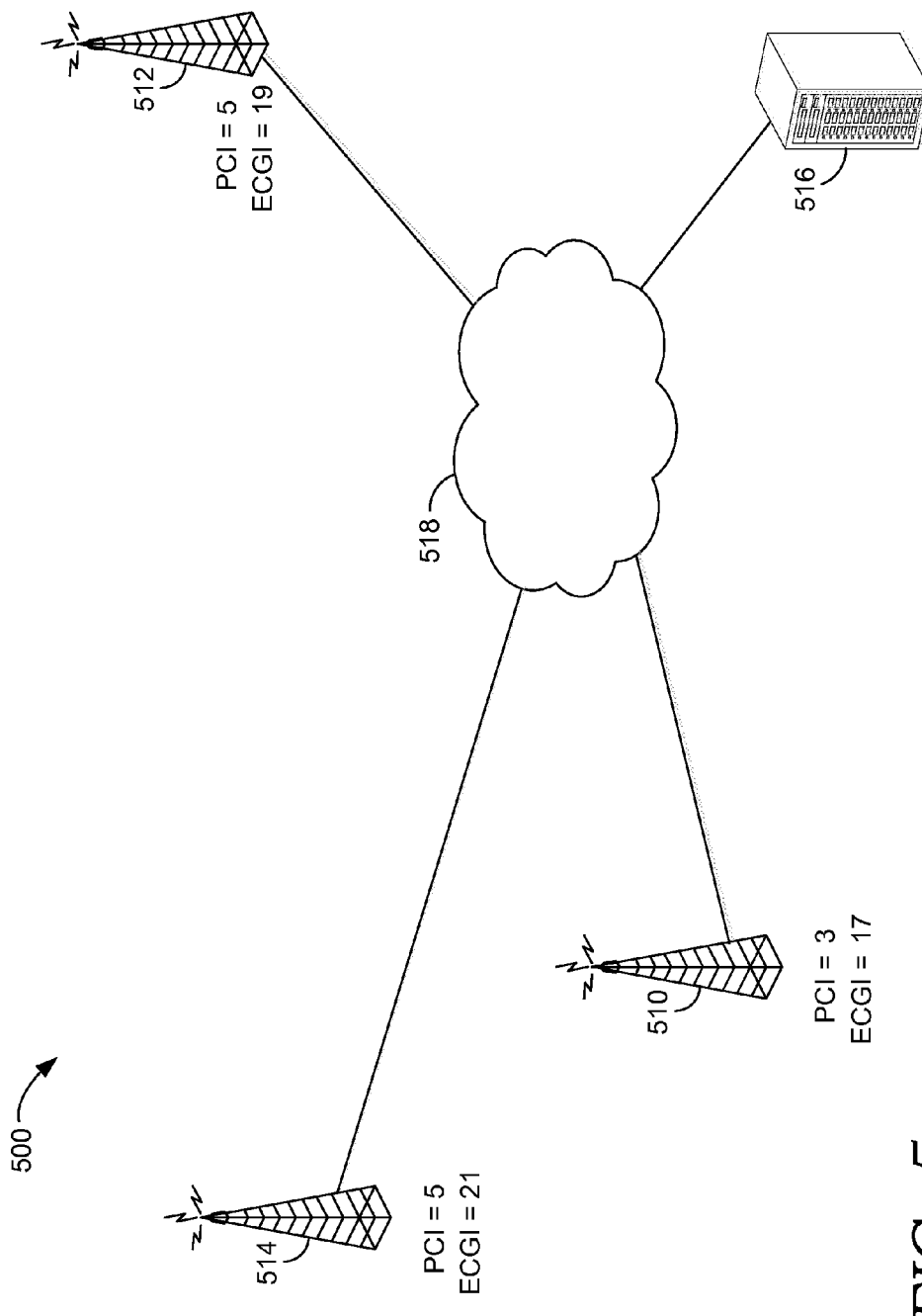
FIG. 5 depicts an operating environment suitable for use in accordance with an embodiment of the present invention.

FIG. 5 depicts an operating environment suitable for use in accordance with an embodiment of the present invention, and is generally referred to as operating environment 500. Operating environment 500 is but one example of a suitable operating environment and is not intended to suggest any limitation as to the scope of use or functionality of the invention. Neither should operating environment 500 be interpreted as having any dependency or requirement relating to any one or combination of components illustrated.

Operating environment 500 as depicted includes an eNB 510, an eNB 512, an eNB 514, a network element 516, and a network 518. eNB 510 has a PCI=3 and an ECGI=17. eNB 512 has a PCI=5 and an ECGI=19. eNB 514 has a PCI=5 and an ECGI=21. As depicted, eNB 512 and eNB 514 have identical PCIs, but different ECGIs. The values of 3, 5, 17, 19, and 21 may or may not be representative of real world values for PCI and ECGI, and are intended only as illustrative examples.

In an embodiment, network 518 includes a telecommunications network(s), or a portion thereof. A telecommunications network might include an array of devices or components, some of which are not shown so as to not obscure more relevant aspects of the invention. Components such as terminals, links, and nodes (as well as other components) can provide connectivity in some embodiments. Network 518 may include multiple networks, as well as being a network of networks, but is shown in more simple form so as to not obscure other aspects of the present invention. In an embodiment, network 518 can be part of a telecommunication network that connects subscribers to their immediate service provider. In an embodiment, network 518 can be associated with a telecommunications provider that provides services to user devices, including voice and/or data services. Network element 516 may reside within, or communicate through, network 518. In an embodiment, network element 516 communicates with base stations, e.g., eNBs, in a market, including eNB 510, eNB 512, and eNB 514.

Although operating environment 500 is described herein in terms of an LTE network as an example, embodiments of the present invention are not limited to use with an LTE network. Other types of networks having functionality similar to an LTE network are also suitable for use with some embodiments. Accordingly, eNBs 510, 512, and 514 may be referred to more generally as base stations 510, 512, and 514.

In the present example, eNB 510 and the more distant eNB 512 represent base stations that were deployed early in the popcorn stage of the network rollout, prior to the deployment of eNB 514. In the present example, prior to the deployment of eNB 514, eNB 510 determined that eNB 512 was a neighboring base station, and eNB 512 was then added to eNB 510's neighbor list. eNB 514, which is nearer to eNB 510 than is eNB 512, has not yet been discovered by eNB 510. As depicted, eNB 514 and eNB 512 share an identical PCI=5, which can result in PCI confusion when eNB 510's neighbor list is outdated, as described above. However, in an embodiment, network element 516 detects the potential for PCI confusion and takes corrective action to update the out-of date neighbor list. Operating environment 500 will be discussed further with regard to FIG. 600.

Figure 6:
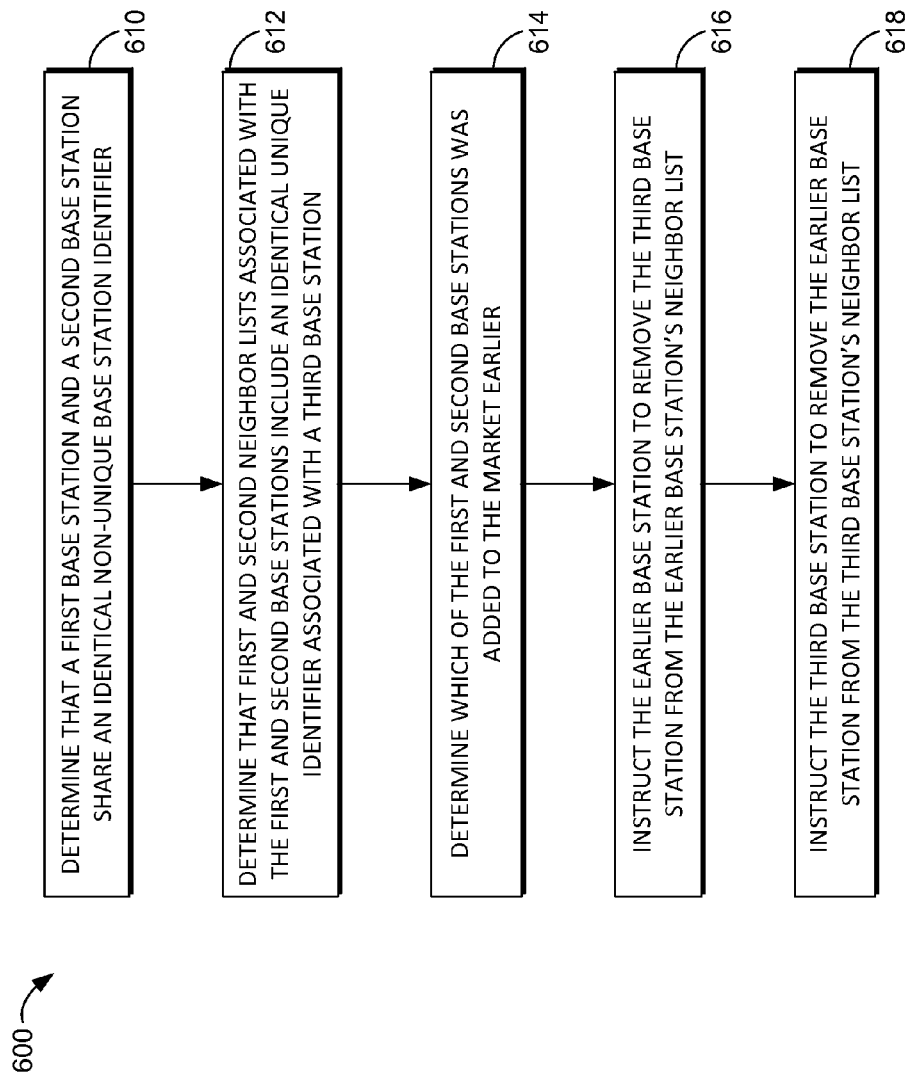
FIG. 6 depicts a flowchart illustrating a method of updating a neighbor list in accordance with an embodiment of the present invention.

With regard to FIG. 6, a flowchart is depicted illustrating a method of updating a neighbor list in accordance with an embodiment of the present invention, and is generally referred to as method 600. Method 600 is but one example of a suitable method and is not intended to suggest any limitation as to the scope of use or functionality of the invention. Neither should method 600 be interpreted as having any dependency or requirement relating to any one or combination of components illustrated.

Method 600 is described herein with reference to FIG. 5. Although method 600 is described in terms of an LTE network, embodiments of the present invention are not limited to use with an LTE network. Other types of networks having functionality similar to an LTE network are also suitable for use with some embodiments. Accordingly, the eNBs described with regard to method 600 may be more generally referred to as base stations.

In an embodiment, network element 516 maintains a table, or list, of the eNBs in the market, which includes the PCI and EGCI for each eNB. Network element 516 may reside in a core network, such as a telecommunication provider's network, which may be represented as network 518 in FIG. 5.

Network element 516 may peripherally located, or even reside outside of network 518, but is configured to communicate with elements of network 518. In an embodiment, network element 516 periodically pulls information for all of the base stations in a given market, such as the PCI, EGCI, and IP address for each eNB in operating environment 500. In an embodiment, network element 516 retrieves the information from Mobility Management Entities (MMEs) and/or Domain Name Servers (DNSs). However, network element 516 may retrieve the information from any source that is configured to supply the information. Based on the retrieved information, network element 516 creates and maintains the table of eNBs. As more eNBs are deployed in the market, the table will grow as the information for new eNBs is added.

With reference to FIG. 6, at step 610, a determination is made that a first base station and a second base station (e.g., eNBs 512 and 514, respectively) share an identical non-unique base station identifier (e.g., PCI=5). In an embodiment, network element 516 monitors the table to determine whether two or more entries share an identical PCI. Network element 516 may perform the determination each time the table is updated, or at some other interval. With reference to FIG. 5, network element 516 determines that eNB 512 and eNB 514 share a PCI=5.

When the determination is made that two base stations share the same PCI, then network element 516 pulls the neighbor lists for each base station that shares the identical value for PCI. In an embodiment, network element 516 communicates with each base station, e.g., eNB 512 and eNB 514, which shares the identical PCI, to retrieve each base station's neighbor list. Network element 516 then compares the retrieved neighbor lists to determine whether the base stations in question share a common neighbor, i.e., whether the retrieved lists share an identical unique identifier, such as the ECGI.

At step 612, and with regard to FIG. 5, a determination is made that eNB 512's neighbor list and eNB 514's neighbor list share the identical ECGI=17, which is associated with a third base station, i.e., eNB 510. Thus, the potential for PCI confusion is discovered by network element 516, in that eNB 512 and eNB 514 share a common neighbor, and also have identical PCIs.

At step 614, a determination is made as to which of the first base station (eNB 512) and the second base station (eNB 514) was added to the market earlier. In the present example, eNB 512 is determined to be the earlier base station. Thus, it is determined that the earlier neighbor relationship between eNB 512 and eNB 510 is outdated, and the up-to-date neighbor relationship should be between eNB 514 and eNB 510.

At step 616, network element 516 instructs the earlier base station (eNB 512) to remove the third base station (eNB 510) from the earlier base station's neighbor list. At step 618, network element 516 instructs the third base station (eNB 510) to remove the earlier base station (eNB 512) from the third base station's neighbor list. The result is that eNB 510 and eNB 512 no longer consider themselves to be neighbors, thus the potential PCI confusion is avoided.

The frequency at which network element 516 pulls the neighbor lists for each base station that shares the identical PCI may vary. In an embodiment, when network element 516 initially determines that two base stations share the same PCI, then network element 516 pulls the associated neighbor lists more frequently for some period of time to quickly identify out-of-date neighbor lists. For example, the neighbor lists may be pulled hourly for a period of one week. If no out-of-date neighbor lists are detected during the period of time, then the frequency of pulling the neighbor lists may be decreased to a lesser value for some period of time. For example, the neighbor lists may be pulled daily for a period of time. If again no out-of-date neighbor lists are detected, then the frequency of pulling the neighbor lists may be reduced again, until at some point a decision is made to stop pulling the neighbor lists, and the neighbor lists are considered to be up-to-date.

A situation may arise where the network is fully deployed in a market, in which two base stations are both neighbors of a third base station, but the two base stations have mistakenly been assigned the same PCI. In that event, PCI confusion would occur just as it does during the popcorn stage of network deployment. However, applying method 600 described above would result in element 516 repetitively trying to update the neighbor lists of the eNBs. This would occur because the associated base stations are legitimate neighbors, and if their neighbor lists are updated to remove the PCI confusion, the base stations will eventually discover each other again and determine themselves to be neighbors. The PCI confusion then happens again. However, if network element 516 determines that the same PCI anomaly occurs repetitively, even though the neighbor lists have been updated, then network element 516 may send a message to the appropriate party, such as a network administrator or other entity associated with the network, that one or both of the eNBs sharing the same PCI needs to have a new PCI assigned to it.

Figure 7:
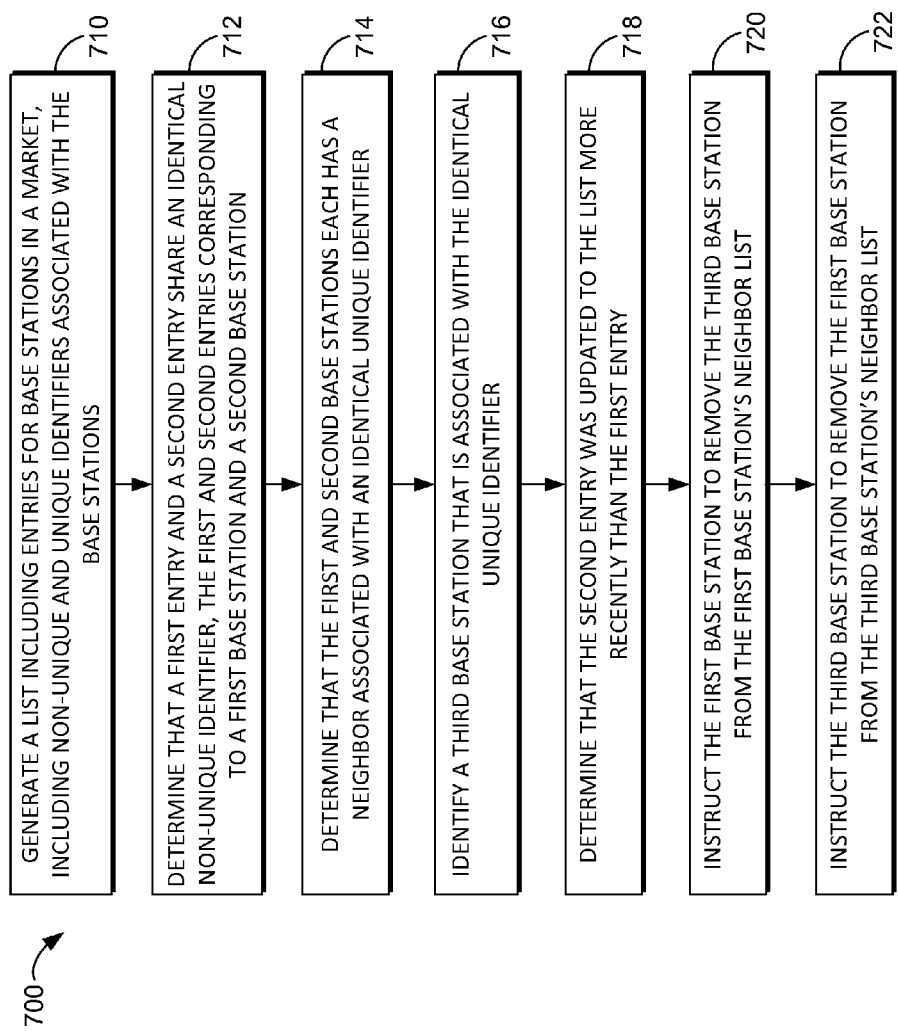
FIG. 7 depicts a flowchart illustrating a method of updating a neighbor list in accordance with an embodiment of the present invention.

With regard to FIG. 7, a flowchart is depicted illustrating a method of updating a neighbor list in accordance with an embodiment of the present invention, and is generally referred to as method 700. Method 700 is but one example of a suitable method and is not intended to suggest any limitation as to the scope of use or functionality of the invention. Neither should method 700 be interpreted as having any dependency or requirement relating to any one or combination of components illustrated. Although method 700 is described in terms of an LTE network, embodiments of the present invention are not limited to use with an LTE network. Other types of networks having functionality similar to an LTE network are also suitable for use with some embodiments. Accordingly, the eNBs described with regard to method 700 may be more generally referred to as base stations.

At step 710, a list, or table, is generated that includes a respective entry for each of a plurality of base stations in a telecommunications market. For each base station, the respective entry includes a non-unique identifier and a unique identifier that are associated with the base station. In an embodiment, the non-unique and unique identifiers correspond to the PCI and ECGI of eNBs in the market. The list may be generated by a network element residing in a telecommunication provider's core network, and the list, or table, may be stored in a database either within, or accessible to, the network element. In an embodiment, the network element is configured to communicate with elements of the telecommunications network, such as DNSs, MMEs, and base stations, among others. The network element may update the list periodically by pulling information from elements within the network.

The network element may monitor the list stored in the database to determine whether two or more of entries share an identical non-unique identifier, which in an embodiment would indicate that two or more eNBs share the same PCI. At step 712, a determination is made that a first entry and a second entry in the list share an identical non-unique identifier, where the first entry and the second entry correspond respectively to a first base station and a second base station.

At step 714, a determination is made that the first base station and the second base station each has a neighbor associated with an identical unique identifier. In an embodiment, the determination is made by the network element retrieving the neighbor lists from the base stations that share the identical non-unique identifier, and comparing the retrieved neighbor lists to determine whether the base stations in question share a common neighbor, i.e., whether the retrieved lists share an identical unique identifier. At step 716, a third base station associated with the identical unique identifier is identified. In an embodiment, the network element identifies the third base station associated with an ECGI that is common to both neighbor lists.

In an embodiment, a determination is made as to which of the first entry and the send entry was more recently updated to the list. The entries in the list may have time/date stamps associated with them, or may be ordered within the list according to when each entry was updated, which may be used to make the determination. At step 718, a determination is made that the second entry was updated to the list more recently than the first entry, thus the first entry is determined to be outdated.

At step 720, based on the determination that the second entry was updated to the list more recently than the first entry, the first base station, which is associated with the first entry, is instructed to remove the third base station from the first base station's neighbor list. At step 722, the third base station is instructed to remove the first base station from the third base station's neighbor list. In an embodiment, the network element sends the instructions to the first and third base stations. At that point, the first and third base stations are no longer on each other's neighbor lists, thus potential PCI confusion is avoided.

Many different arrangements of the various components depicted, as well as components not shown, are possible without departing from the scope of the claims below. Some embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A method for updating a neighbor list, comprising:
   determining that a first base station and a second base station share an identical non-unique base station identifier;
   determining that a first neighbor list and a second neighbor list that are respectively associated with the first base station and the second base station each include an identical unique identifier associated with a third base station;
   determining which of the first base station and the second base station was an earlier base station added to the market;
   instructing the earlier base station to remove the third base station from the earlier base station's respective neighbor list; and
   instructing the third base station to remove the earlier base station from a neighbor list associated with the third base station.

2. The method of claim 1, further comprising generating a list that includes a respective entry for each of a plurality of base stations in a market, wherein for each base station, the respective entry includes a non-unique identifier and a unique identifier that are associated with the base station.

3. The method of claim 2, wherein a network component generates the list periodically.

4. The method of claim 2, further comprising utilizing the list that includes the respective entry for each of the plurality of base stations to determine that the first base station and the second base station each include the identical non-unique base station identifier.

5. The method of claim 4, further comprising utilizing the list that includes the respective entry for each of the plurality of base stations to determine which of the first base station and the second base station was the earlier base station added to the market.

6. The method of claim 1, wherein the first neighbor list and the second neighbor list are retrieved from the first base station and the second base station, respectively.

7. The method of claim 1, the further comprising:
   based on a determination that the steps of
      A) instructing the earlier base station to remove the third base station from the earlier base station's respective neighbor list, and
      B) instructing the third base station to remove the earlier base station from a neighbor list associated with the third base station,
   have occurred repetitively, flagging one or both of the earlier base station and the third base station to be manually updated with a non-unique identifier.

8. One or more non-transitory computer-readable media having embodied thereon computer-usable instructions that, when executed, facilitate a method for updating a neighbor list, the method comprising:
   generating a list that includes a respective entry for each of a plurality of base stations in a market, wherein for each base station, the respective entry includes a non-unique identifier and a unique identifier that are associated with the base station;
   determining that a first entry and a second entry in the list share an identical non-unique identifier, wherein the first entry and the second entry correspond respectively to a first base station and a second base station;
   determining that the first base station and the second base station each has a neighbor associated with an identical unique identifier;
   identifying a third base station that is associated with the identical unique identifier;
   determining that the second entry was updated to the list more recently than the first entry;
   based on the determination that the second entry was updated to the list more recently than the first entry, instructing the first base station associated with the first entry to remove the third base station from a neighbor list associated with the first base station; and
   instructing the third base station to remove the first base station from a neighbor list associated with the third base station.

9. The non-transitory media of claim 8, the method further comprising utilizing the list that includes the respective entry for each of the plurality of base stations to determine that the second entry was updated to the list more recently than the first entry.

10. The method of claim 8, wherein the list is generated periodically by a network component that communicates with the plurality of base stations.

11. The non-transitory media of claim 8, the method further comprising retrieving a first neighbor list and a second neighbor list that are associated respectively with the first base station and the second station that share the identical non-unique identifier.

12. The non-transitory media of claim 11, wherein determining that the first base station and the second base station each has the neighbor associated with the identical unique identifier includes determining that the first neighbor list and the second neighbor list each include the identical unique identifier.

13. The non-transitory media of claim 8, the method further comprising:
based on a determination that the steps of
   A) instructing the first base station to remove the third base station from the first base station's neighbor list, and
   B) instructing the third base station to remove the first base station from the third base station's neighbor list,
have occurred repetitively, flagging one or both of the first base station and the third base station to be manually updated with a non-unique identifier.

14. A system for updating a neighbor list, comprising:
a plurality of base stations each configured to
   A) maintain a neighbor list associated with the base station, wherein the neighbor list includes entries for neighboring base stations, and wherein each entry includes a non-unique identifier and a unique identifier that are associated with a neighboring base station, and
   B) coordinate a handover of a mobile device from the base station to a base station in the neighbor list;
a network component configured to
   A) determine that a first base station and a second base station share an identical non-unique base station identifier,
   B) determine that a first neighbor list and a second neighbor list that are respectively associated with the first base station and the second base station each include an identical unique identifier associated with a third base station,
   C) determine which of the first base station and the second base station was an earlier base station added to the market,
   D) instruct the earlier base station to remove the third base station from the earlier base station's neighbor list, and
   E) instruct the third base station to remove the earlier base station from the third base station's neighbor list.

15. The system of claim 14, further comprising a database that includes an entry for each of the plurality of base stations, wherein for each base station, the entry includes a non-unique identifier and a unique identifier that are associated with the base station.

16. The system of claim 15, wherein the network component is configured to access the database that includes the entry for each of the plurality of base stations to determine that the first base station and the second base station share the identical non-unique base station identifier.

17. The system of claim 16, wherein the network component is configured to access the table that includes the entry for each of the plurality of base stations to determine which of the first base station and the second base station was added to the market earlier than the other.

18. The system of claim 14, wherein the first neighbor list and the second neighbor list are retrieved from the first base station and the second base station, respectively.

19. The system of claim 18, wherein the first neighbor list and the second neighbor list are retrieved based on the determination that the first base station and the second base station share the identical non-unique base station identifier.

20. The system of claim 14, wherein the network component is configured to flag one or both of the earlier base station and the third base station to be manually updated with a non-unique identifier, upon a determination that an identical update is repetitively made to one or both of the earlier base station and the third base station.

* * * * *